United States Patent [19]

Jack et al.

[11] E Re. 28,887

[45] *Reissued June 29, 1976

[54] SEQUENTIAL BLEACHING OF KRAFT PULP WITH CHLORINE DIOXIDE FOLLOWED BY CHLORINE

[75] Inventors: Walter Q. Jack, Youngstown, N.Y.; Loyd V. Johnson, Tacoma, Wash.

[73] Assignee: Hooker Chemicals & Plastics Corporation, Niagara Falls, N.Y.

[*] Notice: The portion of the term of this patent subsequent to Mar. 18, 1986 has been disclaimed

[22] Filed: July 2, 1975

[21] Appl. No.: 592,486

Related U.S. Patent Documents

Reissue of:

[64] Patent No.: 3,501,374
Issued: Mar. 17, 1970
Appl. No.: 787,267
Filed: Dec. 26, 1968

U.S. Applications:

[63] Continuation-in-part of Ser. No. 467,697, June 28, 1965, Pat. No. 3,433,702, now Re. 28,884.

[52] U.S. Cl. ..... 162/66; 8/108; 8/109; 162/67; 162/78; 162/89

[51] Int. Cl.[2] ..... D21C 9/12; D21C 9/14

[58] Field of Search ..... 162/89, 66, 78, 67, 162/90; 8/108, 111, 108.5, 109

[56] References Cited

UNITED STATES PATENTS

| | | | |
|---|---|---|---|
| 2,494,542 | 1/1950 | Casciani | 162/67 |
| 2,513,788 | 7/1950 | Day et al. | 162/89 X |
| 2,741,536 | 4/1956 | Stone | 8/108 X |
| 2,903,326 | 9/1959 | Heitman | 8/108 X |
| 3,020,197 | 2/1962 | Schuber | 162/89 X |

*Primary Examiner*—S. Leon Bashore
*Assistant Examiner*—Arthur L. Corbin
*Attorney, Agent, or Firm*—Peter F. Casella; William J. Crossetta, Jr.

[57] ABSTRACT

There is provided a process for the sequential bleaching of kraft pulp comprising reacting kraft pulp with chlorine dioxide until the chlorine dioxide is [ at least partially ] *more than 50%* depleted, reacting the kraft pulp with chlorine *without an intermediate wash*, and treating the kraft pulp with caustic.

[ Via this process bleached kraft pulps with exceptionally good brightness and strength characteristics are obtained. ]

10 Claims, No Drawings

SEQUENTIAL BLEACHING OF KRAFT PULP WITH CHLORINE DIOXIDE FOLLOWED BY CHLORINE

Matter enclosed in heavy brackets [ ] appears in the original patent but forms no part of this reissue specification; matter printed in italics indicates the additions made by reissue.

This is a continuation-in-part of copending application Ser. No. 467,697, filed June 28, 1965, now Pat. No. 3,433,702 now Re. 28,884.

This invention relates to a process of sequentially treating kraft pulp with chlorine dioxide, chlorine and caustic in a manner whereby the color bodies, lignins and other impurities are more readily removed or brightened.

The bleaching of cellulosic materials, particularly kraft pulp, has been the subject of extensive study and experimentation. As a result, many processes are known for effecting such bleaching operation. Various oxidizing reagents, such as chlorine, chlorine dioxide, alkali and alkaline earth hypochlorites, hydrogen peroxide, and the like have been suggested and used in specific processes wherein the reagent is applied to the cellulosic material in one or more steps.

The more common processes often use more than one reagent and more than one bleaching step. Some of these processes involve treating the kraft pulp with a reagent such as chlorine, washing the residual chlorine and solubilized impurities from the treated material with water, neutralizing or extracting the chlorinated lignins with caustic and washing with water, again treating the kraft pulp with another reagent, such as chlorine, chlorine dioxide or sodium hypochlorite, and again washing the residual reagent and solubilized impurities from the cellulosic material. Processes have been suggested wherein chlorine is used in the first bleaching stage or wherein chlorine dioxide is used in the first stage, or wherein specific mixtures of chlorine dioxide and chlorine are used in the first stage. Each of these processes has various advantages and disadvantages in the treatment of kraft pulp. The particular sequence and reagents used [ affects ] *affect* the brightness of the bleached material, the extent of fiber degradation and, as a result, the fiber strength, brightness, resistance to loss of brightness on aging of the bleached material, and overall, the economics of the process.

It is an object of the present invention to provide a method whereby the advantages of chlorine dioxide and chlorine can be incorporated into a process so that improved characteristics are obtained over previous processes. Another object of this invention is to provide a process whereby improved brightness and improved resistance to loss of brightness on aging are obtained at an economic advantage. A further object of this invention is to provide a process particularly suited for the bleaching of kraft pulp, utilizing conventional chlorine dioxide generating equipment and conventional bleaching equipment. These and other objects will become apparent to those skilled in the art from the description of the invention which follows.

In accordance with this invention, there is provided a process for the sequential bleaching of kraft pulp, comprising the steps of sequentially:

(a) reacting kraft pulp dispersed in aqueous slurry with chlorine dioxide until the chlorine dioxide is [ at least partially ] *more than 50 percent* depleted, and then reacting the kraft pulp with chlorine, *without an intermediate wash*, wherein:

(1) the total available chlorine added by the chlorine dioxide and chlorine is from about 1 to about 10 percent by weight of the kraft pulp, (2) from about 5 to about 90 percent of the total available chlorine is furnished by chlorine dioxide, the remaining available chlorine being furnished by chlorine, (3) the chlorine dioxide is reacted with the kraft pulp for from about 2 to about 75 minutes, and chlorine is reacted with the kraft pulp for from about 2 to about 120 minutes, and (4) the reactions are run at a temperature of from about 0 to about 100 degrees centigrade, thereby forming a neutral to acidic slurry of pulp material with a consistency of from about 2 to about 20 percent (by weight of pulp); and (b) treating said slurry of pulp material with caustic at a temperature of from about 0 to about 100 degrees centigrade for about 15 minutes to about 3 hours until the pH of the slurry is from about 7 to about 12.

The process of this invention is preferably used as the only or first stage of a bleaching operation, and when used as the first stage bleaching operation it is readily incorporated into conventional multi-stage processes.

The process of this invention provides improved characteristics in the bleached material at equivalent available chlorine applications, compared to heretofore known processes, thereby providing an economic advantage and in particular provides especially improved brightness in the bleached material. Although subsequent bleaching stages used in [ multistage ] *multi-stage* bleaching operations and the particular bleaching reagents used in these stages affect the characteristics of the final bleached pulp, improved results are obtained using the method of this invention as the first stage with other normal bleaching reagents, in subsequent stages.

Thus, e.g., where chlorine dioxide and chlorine are sequentially used followed by a caustic extraction, a further chlorine dioxide bleach, a further caustic extraction, and a final chlorine dioxide bleach, vastly superior results are obtained compared with processes wherein either a mixture of chlorine dioxide and chlorine, chlorine alone, or chlorine dioxide alone is used followed by the rest of said ssequence; lesser amounts of chemicals can be used to obtain comparable brightness levels via the process of the present invention. Thus, e.g., the following sequences, inter alia, give much better results than do prior art processes:

Dc*H
DcEHH
DcEHD
DcEHHD
DcEHDH with and without wash after 4th stage
DcHDH with and without wash after 3rd stage
DcHDED with and without wash after 3rd stage
DcEHDEHD with and without wash after 4th stage
DcEDEDH with and without wash after 3rd stage
DcEHDED with and without wash after 4th stage
DcEHED
DcEHPH Dc denotes applicants' sequential process wherein the pulp is treated with chlorine dioxide and chlorine, E denotes caustic extraction, H denotes hydrochlorite treatment, D denotes chlorine dioxide treatment and P denotes peroxide treatment.

It is to be understood that when applicants use the term "sequential" they are referring to a process wherein kraft pulp is treated with chlorine dioxide, chlorine and caustic, with or without [ intermediate or ] subsequent extraction and/or washing steps *and without such intermediate steps* between the chlorine dioxide and chlorine applications. [ Thus, e.g., a sequence wherein a caustic extraction occurs between a prior chlorine dioxide bleaching and the chlorine bleaching is within the scope of applicants' invention; good results are obtained via such a sequence, although it is preferred not to have the caustic extraction step separate the two aforementioned bleaching steps. Thus, e.g., a sequence wherein the woodpulp is washed after it is bleached with chlorine dioxide but before it is bleached with chlorine is within the scope of applicants' invention and yields good results; again, however, it is preferred not to use a washing step inasmuch as even better results—a pulp with a higher degree of brightness, e.g.—are obtained when it is omitted. ] *While a sequence wherein the woodpulp is washed after it is bleached with chlorine dioxide but before it is bleached with chlorine is operative it is preferred not to use such a washing step inasmuch as better results, such as a pulp with a higher degree of brightness, are obtained when it is omitted.*

Especially good results are obtained when applicants' process is used to bleach kraft pulp. Kraft pulp is an alkaline pulp when one or more woods are treated by the sulfate process. In general, any wood or combination of woods may be used to make the kraft pulp which is advantageously bleached by the process of this invention. Thus, e.g., pine woods such as white (northern), white (western), sugar, Norway (red), jack, ponderosa, longleaf, loblolly, lodgepole, shortleaf, slash, and white (eastern) pines [ , ] may be used to prepare the kraft pulp which may be bleached by the process of this invention. Thus, e.g., firs such as Douglas, alpine, balsam, grand, noble, silver, and white firs may be used to prepare such kraft pulp. Thus, e.g., spruces such as black, red, white, Englemann, and Sitka can also be used. Hemlocks such as eastern and western hemlock, larches such as eastern, cypress bald, and western larch, ashes such as white, basswood, and beech ash, birches such as paper and yellow birch, maples such as Manitoba, red, silver, and sugar maple, poplars such as quaking aspen, yellow balsam, eastern cottonwood, and large-toothed aspen, sycamore, butternut, chestnut, cucumber tree, American elm, black gum, sweet gum—any of these may be used to prepare the kraft pulp which may be advantageously bleached by the process of this invention. In the sulfate process one or more of said woods is converted into woodchips or sawdust, and said chips or sawdust are treated in a pressure vessel called a "digester" with a liquor comprised of an aqueous solution of sodium hydroxide or a solution comprised of sodium hydroxide and sodium sulphide. The chips are "cooked" in this liquor to dissolve the interfiber bonding materials of the wood. Thereafter, the pulp is separated from the "black liquor," the residual liquor which contains the spent reagent and part of the wood material. This pulp, whose properties may be varied by varying the reaction conditions in the "cooking" process, is "kraft" pulp, and it is [ with ] this *with* which the bleaching process of this invention may be advantageously used.

Some rather surprising advantages are obtained when the process of this invention is used to bleach kraft pulp. Thus, for example, the effluent from such a bleaching process is less toxic to fish life and of a lighter color than effluents produced by prior art processes, and as such is less objectionable a stream pollutant than they are. Thus, e.g., one unexpectedly obtains an increased yield of the bleached kraft pulp with applicants' process. Thus, e.g., via the process of this invention one unexpectedly consistently obtains a high-viscosity bleached kraft pulp regardless of temperature conditions; with some of the prior art processes, such as those which use chlorine in the first stage, one obtains a kraft pulp with poor viscosity characteristics when the bleaching temperature is relatively high. Thus, e.g., one obtains bleached kraft pulp at the desired brightness levels at much lower costs than with prior art processes. It is to be understood that this list of advantages is merely exemplary and that these advantages accrue when the process of the present invention is used to bleach kraft pulp. Said advantages are especially noticeable when applicants' process is used to bleach kraft pulp [ if ] *and* there is neither an intermediate wash or extraction step between the chlorine dioxide and chlorine bleaching steps.

In the process of the present invention, any source of chlorine dioxide may be used. Thus, e.g., alkali and alkaline earth metal chlorites such as sodium chlorite and potassium chlorite may be used, and one can add such a chlorite to the pulp slurry, acidify the slurry, and generate chlorine dioxide in situ. It is preferred, however, to use chlorine dioxide which is generated from chlorate in, e.g., a chlorine dioxide generator, for it is much less economical to generate the chlorine dioxide in situ. For the sake of convenience, applicants' process is hereinafter disclosed as using chlorine dioxide generated from chlorate; but it is to be understood that the use of chlorine dioxide from any other source is within the scope of their invention.

The bleaching reagents used in the present process are actually reagents which act upon the impurities such as the color bodies and lignin contained in the cellulose material, thereby oxidizing or solubilizing the impurities so that they may be whitened or removed. Since chlorine dioxide and chlorine are gases under most operating conditions, they can be used as such to react on either the dry or wet pulp material. Also, the chlorine dioxide and chlorine can be passed into an aqueous dispersion of pulp or the like to therein react therewith, or they can be absorbed in aqueous solutions and added to the pulp in solution form. However, it is usually more convenient to have the pulp in an aqueous slurry and to add the reagents to the slurry. Thus, the prepared pulp is normally in an aqueous slurry which may be acidic, neutral or basic, and is directly bleached therein.

Therefore, the invention will be more completely described in relation to aqueous slurries of pulp.

In the present process, chlorine dioxide [ or ] *and* chlorine [ is ] *are* added in sequence to the kraft pulp, such that first [ one reagent ] *chlorine dioxide* is added and reacted with the cellulosic material and then the [ second reagent ] *chlorine* is added and reacted, [ generally ] without an intermediate washing or an alkali extraction step. Typically, chlorine dioxide is added and allowed to react for a period of time sufficient to at least partially deplete the chlorine dioxide, i.e., more than about 50 percent is depleted. Then, chlorine is added and reacted with the kraft pulp, which is subsequently treated with caustic. After a reaction of sufficient time to produce the desired results, the residual reagent may be washed from the pulp with water. Other bleaching stages may be applied, using conventional bleaching reagents. Thus, chlorine dioxide, chlorine, hypochlorite, peroxide or mixtures thereof can be used.

Although it is preferred to use the present method in the first stage of a bleaching operation, this process can also be used in a second or later stage or as the only bleaching stage. The addition of the chlorine dioxide is preferably made in sufficient quantity so that a neutral to acidic pulp slurry is formed. Under such conditions, the bleaching action of the reagent is more effective.

Since, in commercial operations the chlorine dioxide may contain a small amount of chlorine due to the simultaneous release of chlorine during most chlorine dioxide generation processes, when it is stated herein that the kraft pulp is treated with chlorine dioxide, such a treatment is with a material which is primarily or substantially all chlorine dioxide, but may contain some chlorine. In the same manner, the chlorine used is primarily or substantially all chlorine, but may contain some chlorine dioxide.

The bleaching time for each reagent in the process of this invention can vary, depending on the bleaching temperature, concentration of the reagents used, the specific characteristics desired in the bleached pulp, and the percentage of pulp dispersed in the aqueous solution. Thus, sufficient time is provided after [ each ] addition *of chlorine dioxide* so that [ the reagent ] *it* is reacted with the pulp, thereby at least partially depleting it prior to the addition of the [ second reagent ] *chlorine*. In most instances the [ reagent ] *chlorine dioxide* is reacted to substantially or to almost completely deplete it prior to the [ next ] addition *of chlorine*. At lower temperatures and lower concentrations of reagent, when the ultimate bleaching capacity of the reagent is to be utilized, longer bleaching times are used.

The total bleaching or reaction time for the process of this invention can be up to about three hours or more. Preferably, the reaction time will be from about five minutes to about two hours. Of this reaction time, it is preferred to react the first reagent, the chlorine dioxide, for a shorter time than the second reagent, the chlorine. It is preferred to use a reaction time ratio of the chlorine dioxide to the chlorine of about 1:2. Thus, in a one hour total reaction time in the first stage, the chlorine dioxide is reacted for about 20 minutes before chlorine is added; it is best then to react the chlorine for about 40 minutes, at which time the chlorine is substantially depleted. Generally the chlorine dioxide is reacted with the kraft pulp for from about 2 to about 75 minutes, and the chlorine is reacted with the kraft pulp for from about 2 to 120 minutes.

The temperature at which the solution is maintained during the bleaching operation can be varied from about 0 degrees centigrade up to about 100 degrees centigrade, but it is normally preferred to effect the bleaching operation in the temperature range of about 5 to about 70 degrees centigrade. The speed of the bleaching reaction is accelerated at the higher temperatures.

The amount of total available chlorine added, whether the available chlorine is added as chlorine dioxide or as chlorine, can vary considerably depending upon the particular characteristics desired to be obtained as a result of the bleaching operation. Normally, 1 to about 10 percent of available chlorine, by weight of the kraft pulp as measured by the percent consistency, is added and reacted with the kraft pulp, the exact amount depending on the particular bleaching requirements, though it is preferred to use from about 3 to about 10 percent of available chlorine. Available chlorine is a measure of the oxidizing power of the reagent using chlorine as the standard. As such, one part by weight of chlorine dioxide is equivalent to 2.63 parts by weight of chlorine. It has been found to be preferable to add 5 to 90 percent of the total available chlorine in the first phase addition (chlorine dioxide) and more preferably to add 10 to 80 percent of the total available chlorine based on the total available chlorine required in the bleaching stage.

After the kraft pulp has been reacted with the chlorine dioxide and chlorine, it is generally of a consistency of from about 2 to about 20 percent. It is then treated with caustic. The caustic treatment is conducted at a temperature of from about 0 to about 100 degrees centigrade, although it is preferred to use a temperature of from about 5 to about 70 degrees centigrade. The caustic treatment is conducted for a sufficient period of time until the pH of the slurry reaches the desired value. It is preferred to have the pH of the slurry be from about 7 to about 12, although it is more preferred to have said pH be from about 8 to about 11, and it is even more preferred to have said pH be from about 10 to about 11. One generally obtains the preferred pH by conducting the caustic treatment for from about 15 minutes to about 3 hours, although the preferred pH may be obtained by using a reaction time of about 30 minutes to about 2 hours and the most preferred pH may be obtained with a reaction time of from about 1 hour to about 2 hours.

After the kraft pulp has been treated with caustic, it is preferred to bleach it with either chlorine dioxide or hypochlorite. The pulp, at this stage, will be of a consistency of from about 10 to about 20 percent. From about 0.1 to about 2 percent of the chlorine dioxide or hypochlorite (by weight of pulp) should be applied. When chlorine dioxide is used, the reaction is run at a temperature of from about 50 to about 90 degrees centigrade for from about 1 to about 5 hours, and the pH of the slurry is maintained at from about 2 to about 6 [ ; ], although it is preferred, when using chlorine dioxide, to use a reaction temperature of from about 65 to about 75 degrees centigrade and maintain the pH at from about 3 to about 5. When hypochlorite is used, the reaction is run at a temperature of from about 20 to about 70 degrees centigrade for from about 1 to about 4 hours, and the pH of the slurry is maintained at from about 8 to about 12 [ ; ] , although it is preferred, when using hypochlorite, to use a reaction temperature of from about 30 to about 50 degrees centigrade and maintain the pH at from about 9 to about 11.

The invention will be further described by reference to the examples which illustrate certain preferred embodiments of this invention. Unless otherwise indicated, all parts and percentages are by weight and all temperatures are in degrees centigrade.

EXAMPLES 1–3

These examples illustrate a comparison between the results obtained by the sequential chlorine dioxide-chlorine-caustic bleaching process of the present invention (Example 1) compared to a mixture of chlorine dioxide and chlorine (Example 2) and the use of chlorine alone (Example 3). The comparative examples were run in a five-stage bleaching operation, wherein the first stage of Example 1 used the method of the present invention, wherein the first stage of Example 2 utilized a mixture of chlorine dioxide and chlorine and wherein the first stage of Example 3 used chlorine. The remaining bleaching stages for each example follow the same sequence of caustic extraction, chlorine dioxide addition, caustic extraction and final chlorine dioxide addition.

Each of the examples was run using equal parts of the same type of unbleached kraft pulp which consisted of 33 percent Douglas fir, 47 percent western hemlock and 20 percent cedar pulps. This pulp mixture had a permanganate number of 21.3, as measured by the Technical Association of Pulp and Paper Industries (TAPPI) Standard Testing Method No. T214m–50 and a chlorited viscosity of 381 centipoises, as measured by the TAPPI Standard Testing Method No. T230su–63. The bleaching time for the first stage was a total of 60 minutes at a temperature of 20 degrees centigrade. In each example, a total of 7.0 percent available chlorine was added in the first stage. The chlorine and chlorine dioxide in each instance was added as an aqueous solution which was passed into the pulp slurry. Table I shows the results obtained.

TABLE I

| | Example Numbers | | |
|---|---|---|---|
| | 1 | 2 | 3 |
| First Stage | | | |
| Available $Cl_2$ ratio, $Cl_2$:$ClO_2$ | 23.77 | 23.77 | 100.0 |
| $ClO_2$ applied, percent | 2.05 | 2.05 | 0 |
| $Cl_2$ applied, percent | 1.61 | 1.61 | 7.0 |
| 1st phase [,] $ClO_2$ residual, percent | 0.28 | — | — |
| 1st phase $ClO_2$ residual, percent | 0.14 | — | — |
| 1st phase terminal pH | 3.1 | — | — |
| End of Stage $Cl_2$ residual, percent | 0 | 0.68 | 0.31 |
| End of Stage $ClO_2$ residual, percent | 0 | 0 | 0 |
| End of Stage $ClO_2$ residual, percent | 0.19 | 0 | 0 |
| Total reaction time, minutes | 60 | 60 | 60 |
| Consistency, percent | 4.2 | 4.2 | 4.2 |
| Temperature, degrees centigrade | 20 | 20 | 20 |
| Second Stage | | | |
| NaOH applied, % | 3.0 | 3.0 | 3.0 |
| Final pH | 12.1 | 11.8 | 11.3 |
| Reaction time, minutes | 120 | 120 | 120 |
| Consistency, % | 9.8 | 9.8 | 9.8 |
| Temperature, degrees centigrade | 74 | 74 | 74 |
| Permanganate number (after second stage reaction) | 2.3 | 3.8 | 3.6 |
| Viscosity, centipoises | 476 | 363 | 198 |
| Third Stage | | | |
| $ClO_2$ applied, % | 1.02 | 1.02 | 1.02 |
| $ClO_2$ consumed, % | 0.94 | 0.97 | 0.98 |
| NaOH applied, % | 0.52 | 0.52 | 0.47 |
| Final pH (end of $ClO_2$ addition) | 4.0 | 3.7 | 3.0 |
| Reaction time, minutes | 180 | 180 | 180 |
| Consistency, % | 6.0 | 6.0 | 6.0 |
| Temperature, degrees centigrade | 74 | 74 | 74 |
| Viscosity, (centipoises) | 380 | 347 | 210 |
| General Electric Brightness Meter Test, % (G.E.) | 85.4 | 78.7 | 80.5 |
| G.E. Brightness, (1 hr. heat-aged), % | 81.3 | 75.8 | 77.6 |
| G.E. Brightness, (18 hr. heat-aged), % | 79.1 | 73.3 | 73.8 |
| Fourth Stage | | | |
| NaOH applied, % | 0.5 | 0.5 | 0.5 |
| Final pH (end of NaOH addition) | 11.7 | 11.4 | 11.5 |
| Reaction time, minutes | 120 | 120 | 120 |
| Consistency, % | 10.8 | 10.8 | 10.8 |
| Temperature, degrees centigrade | 74 | 74 | 74 |
| Fifth Stage | | | |
| $ClO_2$ applied, % | 0.25 | 0.25 | 0.25 |
| $ClO_2$ consumed, % | 0.19 | 0.22 | 0.16 |
| Final pH | 4.0 | 3.7 | 3.5 |
| Reaction time, minutes | 240 | 240 | 240 |
| Consistency, % | 6.0 | 6.0 | 6.0 |
| Temperature, degrees centigrade | 74 | 74 | 74 |
| Total equivalent chlorine applied, % | 10.34 | 10.34 | 10.34 |
| Final Product Quality | | | |
| Viscosity, centipoises | 242 | 290 | 180 |
| G.E. brightness, % | 90.2 | 88.6 | 89.5 |
| G.E. brightness (1 hr. heat-aged), % | 87.1 | 86.5 | 87.7 |
| G.E. brightness (18 hr. heat-aged), % | 84.6 | 84.1 | 83.0 |
| Physical strength at 250 milliliters Canadian Standard (ml. C.S.) freeness: | | | |
| Burst | 219 | 211 | 214 |
| Tear | 185 | 186 | 185 |
| Tensile | 13,600 | 13,750 | 13,000 |
| Double Folds | 6,100 | 5,500 | 5,300 |
| Beating time, minutes to reach 250 ml. C.S. | 68 | 70 | 61 |

Testing was carried out according to TAPPI Standard Testing Methods, wherein the General Electric (G.E.) Brightness was measured according to Standard Method T217m–48 and wherein the one hour [heataged] *heat-aged* brightness test was carried out in a mechanical convection oven at 105 degrees centigrade for the indicated time. The physical tests were carried out according to TAPPI Standard Testing Methods T200ts-61, T205m-58, T218m-59 T402m-49 and T220m-60 wherein the burst strength is in pounds per square inch (p.s.i.) per pound per ream of 500-24 by 40 inch sheets times 100; the tear strength is in grams per pound per ream of 500-24 by 40 inch sheets times 100; the tensile is the breaking length measured in meters of paper, and double folds is per pound per ream of 500-24 by 40 inch sheets times 100.

In Example 1, which illustrates the process of the present invention, the two phase addition employed a reaction time of 20 minutes for the addition of the first reagent, which was chlorine dioxide and a reaction time of 40 minutes for the addition of the second reagent, which was chlorine. A comparison of the data obtained illustrates the improved results obtained by the present method. Higher third and fifth stage brightnesses are obtained by the sequential method. In addition, higher third and fifth stage viscosities are obtained, compared with normal chlorine treatment. The higher brightness of the final product obtained both before and after aging for an 18-hour period illustrates the superiority of the present process in producing superior product characteristics. The strength of the end product is equal to or better than that obtained when only chlorine was used as the bleaching reagent, as illustrated in Example 3, or that resulting when the bleaching reagent was a mixture as illustrated in Example 2. When other kraft pulps are used, similarly good results are obtained. [ Furthermore, when a washing step is used in between the chlorine dioxide and chlorine steps, a bleached pulp with good brightness and strength characteristics is obtained. ]

EXAMPLES 4 [ THROUGH ] - 6

These examples compare the sequential process of the present invention when used as the first stage of a six-stage bleaching process, with the use of a mixture of chlorine dioxide and chlorine in the first stage and the use of pure chlorine in the first stage. The comparisons were run using the same composition of kraft pulp as that used in Examples 1 through 3, dispersed in an aqueous phase. The results of the experiments are shown in Table II. Example 4 is a typical illustration of the use of chlorine as the bleaching reagent in the first stage. Example 5 shows two-phase chlorine dioxide-chlorine addition of the present invention, wherein the chlorine dioxide was reacted for 20 minutes prior to the addition of chlorine, which was then reacted for 40 minutes. Example 6 illustrates the use of a mixture of chlorine dioxide and chlorine in the first stage.

In all examples equivalent amounts of available chlorine were used. The available chlorine was added as aqueous solutions to the pulp slurries. The first stage operating [ temperatures ] *temperature* was 20 degrees centigrade and the total bleaching period for the first stage in Examples 4 through 6 was 60 minutes.

TABLE II

| | Example Numbers | | |
|---|---|---|---|
| | 4 | 5 | 6 |
| First Stage | | | |
| Available $Cl_2$ ratio, $Cl_2$:$ClO_2$ | 100:0 | 50:50 | 50:50 |
| $ClO_2$ [applies] *applied* | 0 | 1.33 | 1.33 |
| $Cl_2$ applied, % | 7.0 | 3.50 | 3.50 |
| 1st phase $ClO_2$ residual, % | — | 0 | — |
| 1st phase $ClO_2^-$ residual, % | — | 0.10 | — |
| 1st phase terminal pH | — | 3.1 | — |
| End of Stage $Cl_2$ residual, % | 0.47 | 0.16 | 0.28 |
| End of Stage $ClO_2$ residual, % | 0 | 0.04 | 0.05 |
| End of Stage $ClO_2^-$ residual, % | 0 | 0 | 0 |
| Total Reaction time, minutes | 60 | 60 | 60 |
| Consistency, % | 4.2 | 4.2 | 4.2 |
| Temperature, degrees centigrade | 20 | 20 | 20 |
| Second Stage | | | |
| NaOH applied, % | 3.0 | 1.5 | 1.5 |
| Final pH | 12.1 | 10.3 | 10.1 |
| Reaction time, minutes | 120 | 120 | 120 |
| Consistency, % | 9.8 | 9.8 | 9.8 |
| Temperature, degrees centigrade | 74 | 48 | 48 |
| Permanganate number | 3.7 | 3.5 | 4.2 |
| Viscosity, centipoises | 200 | 437 | 389 |
| Third Stage | | | |
| $Ca(OCl)_2$ applied, % available $Cl_2$ | 1.30 | 1.30 | 1.30 |
| $Ca(OCl)_2$ consumed, % available $Cl_2$ | — | 1.19 | 1.28 |
| NaOH applied, % | 0.37 | 0.45 | 0.57 |
| Final pH | 10.1 | 9.5 | 10.3 |
| Reaction time, minutes | 120 | 120 | 120 |
| Consistency, % | 10.4 | 10.4 | 10.4 |
| Temperature, degrees centigrade | 35 | 35 | 35 |
| Viscosity, centipoises | 150 | 147 | 209 |
| G.E. brightness, % | 70.4 | 81.1 | 69.8 |
| G.E. brightness (1 hr. heat-aged), % | — | 74.6 | 66.9 |
| G.E. brightness (18 hr. heat-aged), % | — | 72.3 | 64.2 |
| Fourth Stage | | | |
| $ClO_2$ applied, % | 0.50 | 0.50 | 0.50 |
| $ClO_2$ consumed, % | 0.47 | 0.44 | 0.48 |
| Reaction time, minutes | 180 | 180 | 180 |
| Consistency, % | 6.0 | 6.0 | 6.0 |
| Temperature, degrees centigrade | 74 | 74 | 74 |
| Final pH | 3.9 | 4.1 | 3.1 |
| Viscosity, centipoises | 120 | 148 | 202 |
| G.E. brightness, % | 83.0 | 88.1 | 83.8 |
| G.E. brightness (1 hr. heat-aged), % | — | 83.3 | 81.5 |
| G.E. brightness (18 hr. heat-aged), % | — | 80.0 | 77.6 |
| Fifth Stage | | | |
| NaOH applied, % | 0.50 | 0.50 | 0.50 |
| Final pH | 12.0 | 11.5 | 11.4 |
| Reaction time, minutes | 120 | 120 | 120 |
| Consistency, % | 10.8 | 10.8 | 10.8 |
| Temperature, degrees centigrade | 74 | 74 | 74 |

TABLE II-continued

| | | | |
|---|---|---|---|
| Sixth Stage | | | |
| $ClO_2$ applied, % | 0.28 | 0.28 | 0.28 |
| $ClO_2$ consumed, % | 0.23 | 0.16 | 0.17 |
| Final pH | 5.9 | 4.2 | 4.9 |
| Reaction time, minutes | 240 | 240 | 240 |
| Consistency, % | 6.0 | 6.0 | 6.0 |
| Temperature, degrees centigrade | 74 | 74 | 74 |
| Total available [,] $Cl_2$ applied, % | 10.35 | 10.35 | 10.35 |
| Product Quality | | | |
| Viscosity, centipoises | 116 | 162 | 168 |
| G.E. brightness, % | 90.5 | 91.5 | 89.5 |
| G.E. brightness, (1 hr. heat-aged), % | 87.8 | 87.3 | 87.7 |
| G.E. brightness, (18 hr. heat-aged), % | 82.1 | 86.0 | 84.1 |

This comparison illustrates that by the two phase addition of the present invention, it was possible to use 1.5 percent less sodium hydroxide in the second stage than when all chlorine was used as a bleaching reagent. Also, the temperature of the second stage could be operated at 48 degrees centigrade instead of 74 degrees centigrade. This is particularly beneficial in commercial operations, due to the reduction in the chemical and steam requirements. The brightness in the third stage[,] was 11 points higher with the two phase addition than that obtained with either the chlorine or the mixture. The fourth stage brightness was also 4 to 5 points higher with the two phase method and the final brightness after the sixth stage was again higher than that obtained with chlorine or the mixture. All of the tests were run according to TAPPI Standard Testing methods as indicated in Examples 1–3.

When other kraft pulps are used, similarly good results are obtained by the process of this invention. Best results are obtained when no intermediate washing and/or caustic extraction stage is used between the chlorine dioxide and the chlorine steps of this invention.

Good results are also obtained when other extraction or neutralization agents than caustic, such as ammonia and the like, are used [;], although it is preferred to use sodium hydroxide.

EXAMPLES 7–12

These examples show the results obtained when various ratios of chlorine to chlorine dioxide are used in the two phase addition of the present invention. Compared with these changes in chlorine to chlorine dioxide ratios is the use of pure chlorine (Example 7) and pure chlorine dioxide (Example 12).

The experiments were run using unbleached kraft pulp consisting of 49 percent western hemlock, 29 percent balsam, percent Douglas fir and 10 percent cedar pulp. The permanganate number of this pulp was 20.2. The chlorited viscosity was 348 centipoises. Using equal amounts of pulp in an aqueous slurry, the available chlorine was added to the slurries as aqueous solutions. In Examples 8 through 11, which illustrate the process of this invention, the $ClO_2$ was added first and reacted with the kraft pulp for 20 minutes prior to the addition of chlorine which was reacted for 40 minutes. In all of the examples, the reaction time in the first stage with the available chlorine was 60 minutes. Table III shows the results obtained using the described first stage $Cl_2$:$ClO_2$ ratios in a four stage bleaching process. Available chlorine used in the first stage of each example was 6.5 percent based on the weight of oven-dried pulp.

TABLE III

| | Example Numbers | | | | | |
|---|---|---|---|---|---|---|
| | 7 | 8 | 9 | 10 | 11 | 12 |
| First Stage | | | | | | |
| Available $Cl_2$ ratio, $Cl_2$:$ClO_2$ | 100:0 | 80:20 | 60:40 | 40:60 | 20:80 | 0:100 |
| $ClO_2$ applied, % | 0 | 0.494 | 0.988 | 1.48 | 1.98 | 2.47 |
| $Cl_2$ applied, % | 6.50 | 5.20 | 3.90 | 2.60 | 1.30 | 0 |
| 1st phase terminal pH | — | 5.9 | 4.1 | 3.2 | 3.1 | — |
| 2nd phase terminal pH | 2.0 | 2.1 | 2.3 | 2.3 | 2.4 | 2.6 |
| Viscosity, centipoises | 147 | 191 | 192 | 179 | 201 | 265 |
| Second Stage | | | | | | |
| NaOH applied, percent | 3.5 | 3.5 | 3.5 | 3.5 | 3.5 | 3.5 |
| Viscosity, centipoises | 210 | 289 | 238 | 272 | 267 | 292 |
| Permanganate Number | 3.8 | 2.5 | 1.8 | 2.1 | 2.8 | 4.8 |
| Third Stage | | | | | | |
| NaOCl applied, % avail. $Cl_2$ | 1.0 | 1.0 | 1.0 | 1.0 | 1.0 | 1.0 |
| Viscosity, centipoises | 184 | 211 | 181 | 147 | 185 | 243 |
| G.E. brightness, % | 60.8 | 67.4 | 71.5 | 75.5 | 70.6 | 59.5 |
| G.E. brightness, % (18 hr. heat-aged) | 55.6 | 60.7 | 65.0 | 68.8 | 64.2 | 55.0 |
| Fourth Stage | | | | | | |
| $ClO_2$ applied, % | 0.55 | 0.55 | 0.55 | 0.55 | 0.55 | 0.55 |
| Viscosity, centipoises | 187 | 195 | 175 | 145 | 204 | 238 |
| G.E. brightness, % | 81.6 | 82.2 | 84.8 | 85.2 | 83.4 | 72.3 |
| G.E. brightness, % (1 hr. heat-aged) | 79.4 | 80.4 | 81.8 | 82.5 | 80.8 | 70.6 |
| G.E. brightness, % (18 hr. heat-aged) | 75.2 | 77.0 | 79.2 | 80.1 | 78.6 | 68.1 |

An analysis of the example results shows that improved pulp characteristics are obtained at each of the chlorine to chlorine dioxide ratios of the present invention compared to either chlorine [,] alone or chlorine dioxide alone. Also shown is that a 60:40 chlorine to chlorine dioxide ratio produces the lowest permanganate number with the pulp used. Third and fourth stage brightness and heat-aged brightness are highest at a ratio of about 40:60 $Cl_2$:$ClO_2$ and in all comparable instances are better than either the pure chlorine of Example 7 or the pure chlorine dioxide of Example 12.

Similarly good results are obtained when other kraft pulps are used. While there have been described many embodiments of the present invention, the methods described are not intended to be understood as limiting the scope of the invention as it is realized that changes therein are possible. It is further intended that each element recited in any of the following claims is to be understood as referring to all elements for accomplishing substantially the same results in substantially the same or equivalent manner. It is intended to cover the invention broadly in whatever form its principles may be utilized.

What is claimed is:

1. A process for the sequential bleaching of kraft pulp, comprising the steps of sequentially:

(a) reacting kraft pulp dispersed in aqueous slurry with chlorine dioxide until the chlorine dioxide is [ at least partially ] *more than 50 percent* depleted, and then reacting the kraft pulp with chlorine, *without an intermediate wash*, wherein:

(1) the total available chlorine added by the chlorine dioxide and chlorine is from about 1 to about 10 percent by weight of the kraft pulp, (2) from about 5 to about 90 percent of the total available chlorine is furnished by chlorine dioxide, the remaining available chlorine being furnished by chlorine, (3) the chlorine dioxide is reacted with the kraft pulp for from about 2 to about 75 minutes, and the chlorine is reacted with the kraft pulp for from about 2 to about 120 minutes, and (4) the reactions are run at a temperature of from about 0 to about 100 degrees centigrade, thereby forming a neutral to acidic slurry of pulp material with a consistency of from about 2 to about 20 percent (by weight of pulp); and (b) treating said slurry of pulp material with caustic at a temperature of from about 0 to about 100 degrees centigrade for about 15 minutes to about 3 hours until the pH of the slurry is from about 7 to about 12.

[ 2. The process of claim 1, wherein the chlorine dioxide and chlorine are sequentially reacted with the kraft pulp without an intermediate wash. ]

3. The process of claim [ 2 ] *1*, wherein:

(a) from about 10 to about 80 percent of total available chlorine is furnished by chlorine dioxide, the total available chlorine added by the chlorine dioxide and chlorine being from about 3 to about 10 percent by weight of the kraft pulp;

(b) the reactions of the kraft pulp with chlorine dioxide and chlorine and the treatment of the kraft pulp with caustic are conducted at a temperature of from about 5 to about 70 degrees centigrade; and (c) the caustic treatment is conducted for from about 30 to about 120 minutes until the pH of the slurry is from about 8 to about 11.

4. The process of claim 3, wherein the chlorine dioxide and chlorine are sequentially reacted with the kraft pulp without an intermediate alkali extraction.

5. The process of claim 4, wherein, after the kraft pulp is treated with caustic, it is subsequently bleached with from about 0.1 to about 2 percent (by weight of [ available chlorine content ] *pulp*) of a bleaching reagent selected from the group consisting of chlorine dioxide and hypochlorite.

6. The process of claim 5, wherein, after the kraft pulp has been treated with caustic, it is subsequently bleached with chlorine dioxide at a temperature of from about 50 to about 90 degrees centigrade for from about 1 to about 5 hours until the pH of the slurry is from about 2 to about 6.

7. The process of claim 5, wherein, after the kraft pulp has been treated with caustic, it is subsequently bleached with hypochlorite at a temperature of from about 20 to about 70 degrees for from about 1 to about 4 hours until the pH of the slurry is from about 8 to about 12.

8. The process of claim 6, wherein the subsequent chlorine dioxide bleaching is conducted at a temperature of from about 65 to about 75 degrees centigrade until the pH of the slurry is from about 3 to about 5.

9. The process of claim 7, wherein the subsequent hypochlorite bleaching is conducted at a temperature of from about 30 to about 50 degrees centigrade until the pH of the slurry is from about 9 to about 11.

10. The process of claim 8, wherein the caustic treatment is conducted for from about 1 to about 2 hours.

*11. The process of claim 1, wherein the sequential chlorine dioxide and chlorine bleachings are effected in a first bleaching stage and such stage is followed by a caustic extraction and at least one additional bleaching stage wherein the bleaching agent is selected from the group consisting of chlorine dioxide, chlorine, hypochlorite, peroxide and mixtures thereof.*

* * * * *

UNITED STATES PATENT OFFICE

CERTIFICATE OF CORRECTION

PATENT NO. : RE 28,887

DATED : June 29, 1976

INVENTOR(S) : Walter Q. Jack and Loyd V. Johnson

It is certified that error appears in the above-identified patent and that said Letters Patent are hereby corrected as shown below:

Column 2, line 52 "ssequence" should read ---sequence---.
Column 3, line 3, "hydrochlorite" should read ---hypochlorite---.
Column 12, line 21, "balsam, percent" should read ---balsam, 12 percent---.

Signed and Sealed this

Fifth Day of April 1977

[SEAL]

*Attest:*

RUTH C. MASON
*Attesting Officer*

C. MARSHALL DANN
*Commissioner of Patents and Trademarks*